United States Patent [19]

Remillieux

[11] 4,292,053

[45] Sep. 29, 1981

[54] DECLOGGING PROCESS FOR FILTRATION INSTALLATION AND IMPROVED FILTRATION INSTALLATION

[75] Inventor: Jean Remillieux, Meudon-la-Foret, France

[73] Assignee: Air Industrie, Courbevoie, France

[21] Appl. No.: 127,070

[22] Filed: Mar. 4, 1980

[30] Foreign Application Priority Data

Mar. 5, 1979 [FR] France .................. 7905659

[51] Int. Cl.³ .......................................... B01D 46/04
[52] U.S. Cl. .......................................... 55/96; 55/273; 55/283; 55/287; 55/302
[58] Field of Search ................... 55/96, 261, 266, 286, 55/287, 291, 293, 302, 304, 83, 273, 283

[56] References Cited

U.S. PATENT DOCUMENTS

| | | | |
|---|---|---|---|
| 3,178,868 | 4/1965 | Gibby | 55/96 |
| 3,212,237 | 10/1965 | Wright | 55/96 |
| 3,893,833 | 7/1975 | Ulvestad | 55/287 |
| 4,046,526 | 9/1977 | Phillippi | 55/302 |

FOREIGN PATENT DOCUMENTS

| | | | |
|---|---|---|---|
| 156753 | 6/1921 | United Kingdom | 55/96 |
| 344227 | 3/1931 | United Kingdom | 55/96 |

*Primary Examiner*—David L. Lacey
*Attorney, Agent, or Firm*—Larson and Taylor

[57] ABSTRACT

The invention relates to filtration apparatus and to a process for a filtration installation comprising several filtration cells equipped with at least one filtering element through which passes a current of dust-laden gas, this process consisting in isolating the filtration cell to be declogged, then in proceeding with declogging the filtering element(s) of this cell, and wherein further, after having isolated the filtration cell and before proceeding with the declogging thereof, it is scavenged by a counter-current of an inert gas, this counter-current scavenging being carried out under conditions such that the inert gas completely renews the atmosphere of this cell, without causing the layer of dust deposited on the upstream face of the filtering element(s) of said cell to be detached.

14 Claims, 3 Drawing Figures

DECLOGGING PROCESS FOR FILTRATION INSTALLATION AND IMPROVED FILTRATION INSTALLATION

FIELD OF THE INVENTION

The invention is relative to filtration installations comprising several filtration cells each equipped with at least one filtering element through which passes a dust-laden gas, in a direction which will be called hereafter "normal direction."

BACKGROUND OF THE INVENTION

The invention concerns declogging processes for such installations, as well as the installations using these processes.

The filtering element has an upstream face which is met by the dust-laden gas and a downstream face, the dust being deposited then on said upstream face.

It will be readily understood that it is necessary to periodically clean the filtering element so as to remove the layer of dust deposited on the upstream face, this operation being called "declogging."

When the filtration installation comprises, as pointed out above, several filtration cells, it is known to carry out the clogging cell by cell, i.e. one cell is isolated and the declogging of the filtering element(s) of this cell is carried out, the other cells remaining active.

Furthermore, it is frequent for a filtration installation to operate in an explosive environment, that is to say that either the gas, or the dust, or the gas and the dust may form under certain conditions an explosive medium.

Now, the declogging operation which results in the loosening of the dust layer (or cake) deposited on the upstream face of each filtering element, generates electrostatic charges possibly giving rise to electric discharges which create a risk of explosion.

It has already been proposed, so as to avoid this risk of explosion, to carry out the declogging after having filled the cell with an inert gas (neutral gas or weak gas) preventing the conditions for an explosion from being achieved.

The processes of this kind known up to present have generally the disadvantage of requiring a considerable amount of inert gas, which made the declogging operation expensive.

The invention has precisely as its aim to remedy this disadvantage.

SUMMARY OF THE INVENTION

The process in accordance with the invention consists in isolating the filtration cell to be declogged, then in carrying out the declogging of the filtering element(s) of this cell, the improvement being that, after having isolated the filtration cell and before going ahead with the declogging thereof, it is scavenged by a counter-current-fed inert gas, this counter-current scavenging being carried out under conditions such that the inert gas completely renews the atmosphere of this cell, without causing the dust layer deposited on the upstream face of the filtering element(s) of said cell to be detached.

According to an advantageous embodiment of this process, after declogging the filtration cell, it is once more scavenged with a counter-current-fed inert gas under conditions such that the inert gas accompanies the fall of the fragments of the dust layer towards discharge means provided in a lower zone of the filtration installation.

According to the invention, the filtration installation comprises:

several filtration cells each equipped with at least one filtering element through which passes a dust-laden gas current, an inlet enclosure common to the filtration cells, situated on the upstream face side of the filtering elements, and connected to a dust-laden gas supply, an outlet enclosure for each filtration cell, situated on the downstream face side (opposite the upstream face) of the filtering elements, a collecting enclosure common to the filtration cells, communicating with each outlet enclosure through closure means controllable independently for each cell, and connected to a dust-free gas discharge, declogging means for the filtering element(s) of each filtration cell, these declogging means being controllable independently for each cell, and discharge means provided in the lower zone of the inlet enclosure, and wherein inlet means are further provided for scavenging by means of an inert gas fed counter-currentwise into each outlet enclosure, these scavenging inlet means being controllable independently for each outlet enclosure and being fed from a source of inert gas so that when said inlet scavenging means are open, the counter-current flow of the inert gas produces complete renewal of the atmosphere in this cell, without causing the layer of dust deposited on the upstream face of the filtering element(s) of the filtration cell considered to be detatched.

According to one arrangement of the invention, the installation comprises mechanical declogging means.

According to another arrangement of the invention, the installation comprises inert gas pneumatic declogging means.

In such a case, the inert gas source includes a pneumatic device (complementary source of inert gas or compressor) adapted to generate an inert gas flow capable of causing the layer of dust deposited on the upstream face of the filtering element(s) of the considered cell to be loosened and detached, when the inlet means are open.

It will be readily understood that with the invention the inert gas first of all fills the outlet enclosure of a respective filtration cell passes through the filtering element(s) of this filtration cell and through the layer of dust deposited on the upstream face of its respective filtering element or elements (without causing it to be loosened) and finally flows into the part of the filtration cell which surrounds the filtering element(s) considered.

Thus just the amount of inert gas required to avoid any risk of explosion in the filtration cell during declogging may be used, thus avoiding having to fill the whole of the filtration cell with inert gas.

Preferably, there is provided in the inlet enclosure partial separation walls separating, without isolating them one from another, the filtering element(s) of the filtration cells.

This arrangement promotes the confinement of the inert gas about the filtering element(s) of each filtration cell.

The invention consists, apart from the arrangements which have just been discussed, of certain other arrangements which are used preferably at the same time and which will be more explicitly discussed hereafter.

The above and other objects, features and advantages of the present invention will become apparent from the following description, given solely by way of non-limiting illustration, when taken in conjunction with the accompanying drawings.

DESCRIPTION OF THE PREFERRED EMBODIMENTS

Figure 1:
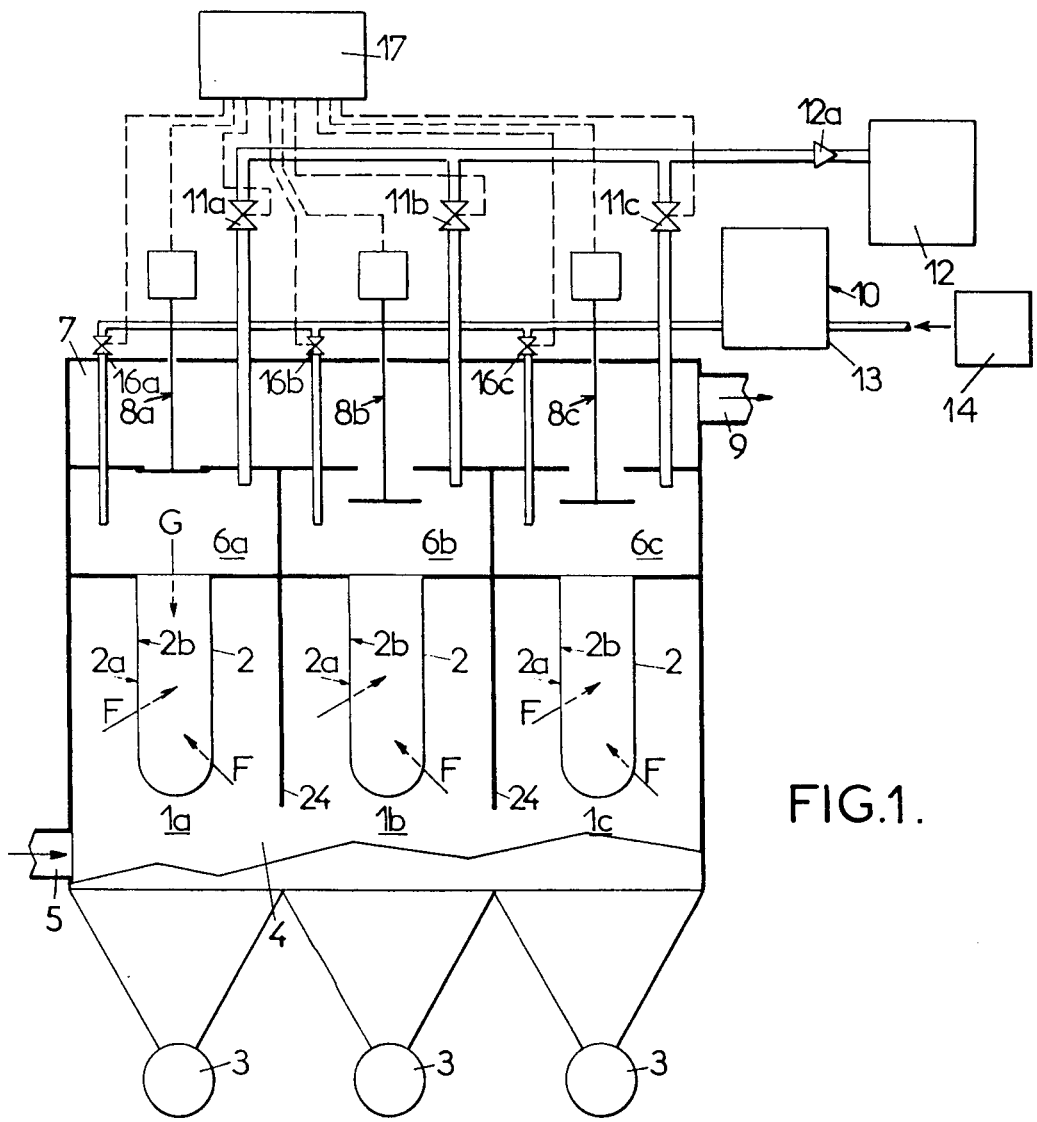
FIG. 1 is a schematical view of a first embodiment of a filtration installation in accordance with the invention.
Figure 2:
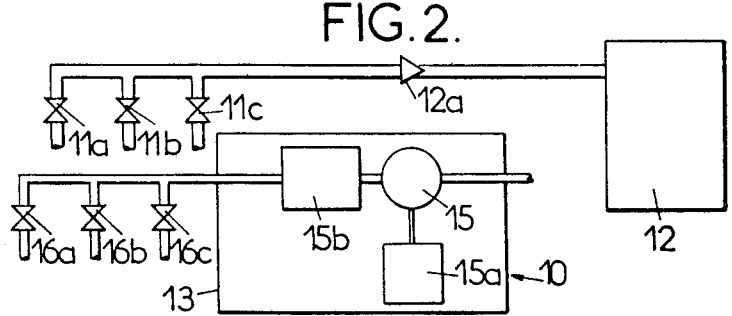
FIG. 2 is a detailed view illustrating a variation of the invention.

In FIGS. 1 and 2, there is shown a filtration installation comprising several filtration cells $1a$, $1b$, $1c$ . . . .

Figure 3:
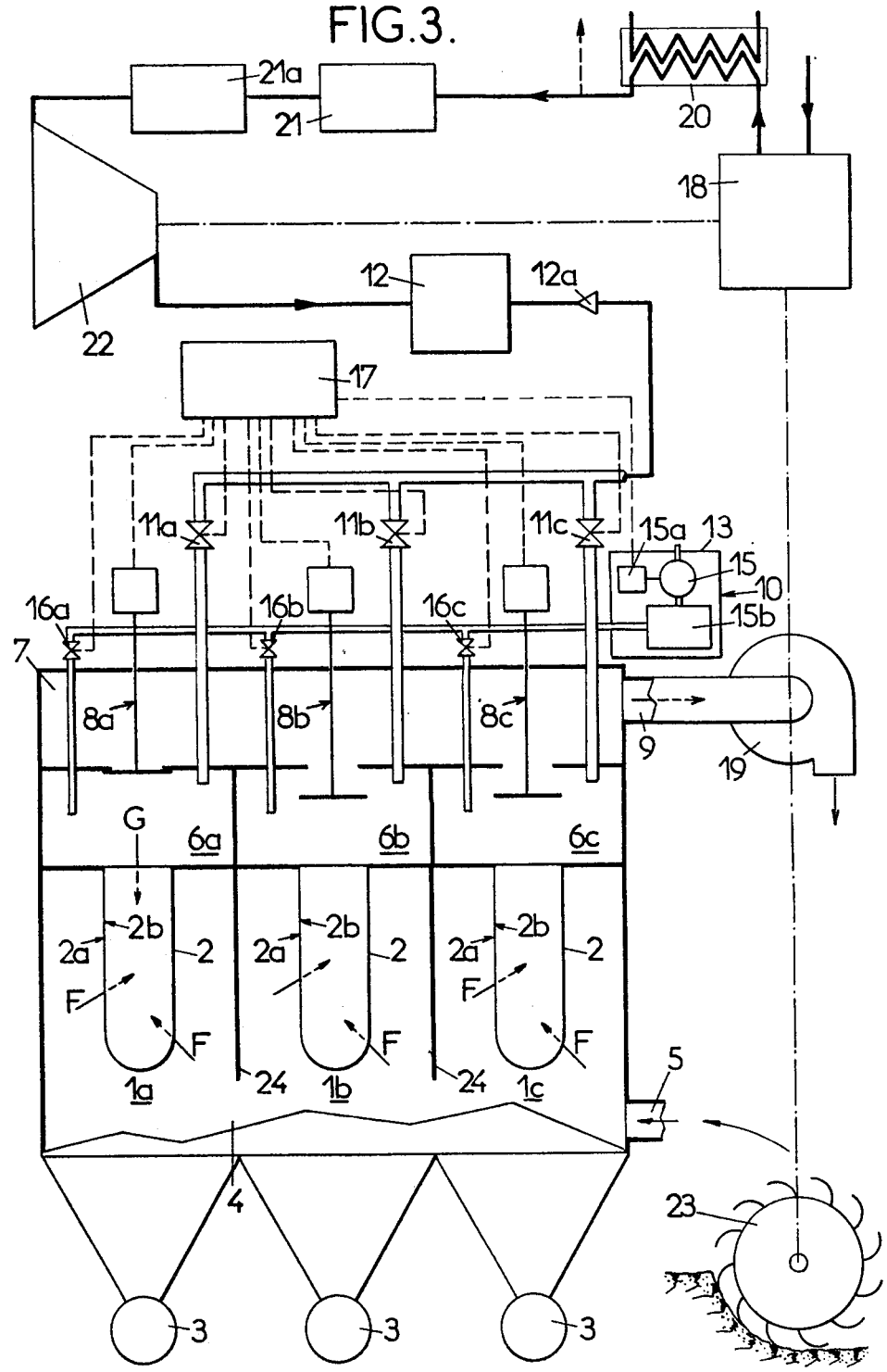
FIG. 3 is a schematical view showing a particular embodiment of the invention.

Each filtration cell $1a$, $1b$, $1c$ . . . is equipped with at least one filtering element 2 such, for example, as a sleeve or pocket filter (only one of these filtering elements 2 being shown in FIGS. 1 and 3).

Dust-laden gas passes through this filtering element in the normal direction shown by arrows F.

According to the process of the invention:
the filtration cell to be declogged, in this instance cell $1a$, is isolated, the isolated filtration cell $1a$ is scavenged by a counter-current, i.e. in the direction shown by arrow G and opposite the normal direction shown by arrows F, this counter-current scavenging being carried out in flow conditions such that there is no detachment of the dust layer deposited on the upstream face $2a$ of the filtering element 2 of the cell, such scavenging being effected with an inert gas, and declogging of the filtering elements 2 of the cell $1a$ is then carried out.

The scavenging phase corresponds at least to the complete renewal of the atmosphere in the filtration cell $1a$.

According to a preferred operating mode, counter-current scavenging and preferably with the same inert gas, is carried out again; this additional scavenging is intended to accompany the fall of fragments of the dust layer towards the discharge means generally designated by the reference FIG. 3 and provided in the lower zone of the filtration installation.

To implement such a process, the filtration installation comprises in combination:

filtration cells $1a$, $1b$, $1c$ . . . which have just been discussed, each of said filtration cells comprising at least one filtering element 2 through which passes the dust-laden gas in the normal direction shown by arrows F, an inlet enclosure 4 common to filtration cells $1a$, $1b$, $1c$ . . . situated on the upstream face $2a$ side of the filtering elements 2 and connected to a dust-laden gas introduced through supply conduit 5, an outlet enclosure $6a$, $6b$, $6c$ . . . for each filtration cell $1a$, $1b$, $1c$ . . . situated on the downstream face $2b$ side (opposite the upstream face $2a$) of the filtering elements 2, a collecting enclosure 7, common to the filtration cells $1a$, $1b$, $1c$ . . . communicating with each outlet enclosure $6a$, $6b$, $6c$ . . . through closure means $8a$, $8b$, $8c$ . . . , said collecting enclosure 7 being connected to a dust-free gas discharge 9.

For declogging the filtering elements 2 of such an installation, there are provided:

declogging means 10 for the filtering element 2 of each filtration cell $1a$, $1b$, $1c$, these declogging means 10 being controllable independently for each cell $1a$, $1b$, $1c$ . . . .

scavenging gas inlet valves $11a$, $11b$, $11c$ . . . for admitting an inert gas into each outlet enclosure $6a$, $6b$, $6c$, these inlet valves $11a$, $11b$, $11c$ . . . being controllable independently for each outlet enclosure $6a$, $6b$, $6c$ . . . and being supplied from an inert gas source 12 with a flow such that they do not cause the layer of dust on the upstream face $2a$ of filtering element 2 of a respective cell to be loosened when the inlet means concerned are open, and discharge means 3 provided in the lower zone of the inlet enclosure 4, as indicated above.

Although declogging means 10 may be mechanical, it seems desirable to give preference to inert gas pneumatic declogging means.

In such a case, a pneumatic device 13 is provided supplied with inert gas (complementary source 14, FIG. 1, or compressor 15 driven by a motor $15a$, FIGS. 2 and 3) adapted to generate an inert gas flow capable of causing the dust layer deposited on the upstream face $2a$ of the filtering element 2 of a respective cell to be loosened and detached when this pneumatic device is made to communicate with said filtration cell.

For this purpose, the pneumatic device 13 is connected by declogging gas inlet valves $16a$, $16b$, $16c$ to each outlet enclosure $6a$, $6b$, $6c$, these inlet valves $16a$, $16b$, $16c$ being controllable at will for each outlet enclosure $6a$, $6b$, $6c$.

The operation of the installation is then the following.

1. Installation completely in the filtration condition:
closure means $8a$, $8b$, $8c$ . . . are open,
inert gas scavenging inlet valves $11a$, $11b$, $11c$ . . . are closed as well as declogging gas declogging valves $16a$, $16b$, $16c$.

2. Preparation for declogging the filtration cell $1a$:
closure means $8a$ are actuated to close them.

3. Declogging of filtration cell $1a$:
the scavenging inlet valve $11a$ of filtration enclosure $1a$ is opened to cause the first scavenging,
said scavenging gas inlet valve $11a$ is closed and the declogging gas inlet valve $16a$ of the filtration enclosure $1a$ is opened to connect said enclosure to the complementary source 14 or to compressor 15 (after having started up the motor $15a$) to cause the loosening of the cake,
said declogging inlet valve $16a$ is closed.

4. Discharge of the dust from the filtration cell $1a$:
the discharge means 3 provided for this purpose in the lower zone of of the installation or of the inlet enclosure are brought into operation, these discharge means 3 being possibly common to all the filtration cells or each disposed below a filtration cell,
the first scavenging of the filtration cell $1a$ is possibly continued by again opening the scavenging gas inlet valve $11a$ of this filtration cell.

5. Bringing the installation completely back to the filtration condition:
the scavenging gas inlet valve $11a$ of filtration cell $1a$ is closed,
closure means $8a$ of the filtration cell $1a$ are actuated to control the closure thereof.

To control closure means $8a$, $8b$, $8c$ . . . , the scavenging gas inlet valves $11a$, $11b$, $11c$, the declogging gas inlet valves 16a, 16b, 16c and, in the case of FIGS. 2 and 3, the motor 15a of compressor 15, a programming device 17 may be utilized.

It may be noted that in the case of FIGS. 2 and 3, the compressor 15 is permanently driven by a motor 15a; an accumulation reservoir 15b is then provided at the outlet of the compressor.

This arrangement allows the flow rate required for the declogging operation to be injected in a very short time.

A non-return valve 12a may be provided at the outlet of the inert gas source 12 (FIGS. 1 to 3); this arrangement simplifies the operation of the installation by making closure of the scavenging gas inlet valves 11a, 11b, 11c during the declogging phase unnecessary.

According to one mode of application of the invention which is illustrated in FIG. 3, the inert gas used for declogging is formed by all or part of the exhaust gases of an internal combustion engine 18 which drives, by any appropriate transmission means, an extraction fan 19 connected to the dust-free gas discharge 9.

The exhaust gases of this engine 18 are previously cooled in an exchanger 20, then filtered in a filter 21, and possibly in an ultra-filter 21a, before being compressed in a compressor 22, itself driven by said internal combustion engine 18.

At the outlet of compressor 22, the inert gas formed by the cooled and filtered exhaust gases from the internal combustion engine 18 are directed towards gas source 12.

Such an installation may be advantageously used in the mining industry, particularly in sulfur mines.

The internal combustion engine 18 is then provided for driving an extraction mechanism 23, this extraction mechanism being the dust-generating apparatus.

Then a proportionality is obtained between the production of material to be extracted (so the volume of air to be filtered) and the production of inert gas for implementing the declogging operation.

In any case, and whatever the embodiment adopted, it is advantageous to provide in the inlet enclosure 4 partial separation walls 24 separating, without isolating them from one another, the filtering element 2 of each filtration cell 1a, 1b, 1c . . . .

It is apparent that within the scope of the invention, modifications and different arrangements can be made other than are here disclosed. The present disclosure is merely illustrative with the invention comprehending all variations thereof.

I claim:

1. A method of declogging at least one filtration element of a filtration cell of a filtering installation for filtering a dust-laden gas, said installation comprising a plurality of filtration cells, each filtration cell comprising at least one filtering element having an upstream face and a downstream face, said dust-laden gas passing through said filtering element from said upstream face to said downstream face whereby a layer of dust is deposited from said dust-laden gas on the upstream face of said filter element, said installation further comprising an outlet enclosure at the downstream face of said at least one filtering element and an inlet enclosure at the upstream face of said at least one filtering element, said method comprising the steps of:

isolating, from the flow of dust-laden gas, a filtration cell to be declogged, said filtration cell having at least one filtering element having a layer of dust;

admitting into the isolated cell a first flow of inert gas in a direction counter-current to the direction of flow of dust-laden gas such that the inert gas passes through said at least one filtering element in said filtration cell from the downstream face of the at least one element to its upstream face, the flow of at said inert gas being such that the inert gas first fills said outlet enclosure of said isolated cell, passes through the at least one filtering element and into the area of said inlet enclosure surrounding the at least one filtering element of said isolated cell without causing the dust layer thereon to be detached;

admitting into the isolated cell a second flow of inert gas in said counter-current direction, the flow of said second flow of inert gas being such that the dust layer is detached from said at least one element.

2. A method according to claim 1 wherein said filtration installation includes dust discharge means provided in a lower part of each filtration cell and wherein said at least one filtration element of a filtration cell is positioned such that dust detached therefrom falls downwardly towards said dust discharge means, said method further comprising admitting into the isolated cell a third flow of inert gas in said counter-current direction, the flow of said third flow of inert gas being such that the flow of inert gas accompanies the fall of the dust towards said discharge means.

3. A method according to claim 2 further comprising discharging dust from said isolated filtration cell.

4. A method according to claim 1 further comprising reintroducing into said isolated cell a flow of said dust-laden gas for filtration thereof.

5. A method according to claim 1 wherein said isolated filtration cell comprises a plurality of said filtering elements.

6. A method according to claim 1 wherein said flow of said inert gas is such that the inert gas does not fill the entire filtration cell.

7. A method according to claim 1 wherein said flow of inert gas is such that the inert gas completely replaces the atmosphere of the isolated filtration cell.

8. Filtration apparatus comprising:

a plurality of filtration cells, each filtration cell having at least one filtering element having an upstream face and a downstream face and through which passes, in use, a dust-laden gas flow from the upstream face to the downstream face;

an inlet enclosure for all the filtration cells, said inlet enclosure having a gas inlet and enclosing the upstream face of the at least one filtering element;

an outlet enclosure for each filtration cell, said enclosure having a gas outlet and being in flow communication with the at least one filtering element;

a collecting enclosure for all the filtration cells, said collecting enclosure communicating with each outlet enclosure through closure means controllable independently for each cell, said collecting enclosure being connected to a dust-free gas-discharge means;

means for isolating, from a flow of dust-laden gas, a filtration cell to be declogged;

means for admitting to an isolated filtration cell a first flow of inert gas in a direction counter-current to the direction of flow of dust-laden gas such that the inert gas passes through the at least one filtering element in said filtration cell from the downstream face of the at least one element to its upstream face, with a flow such that the inert gas first fills said outlet enclosure of said isolated cell, passes through the at least one filtering element and into the area of said inlet enclosure surrounding the at least one filtering element of said isolated cell without causing the dust layer thereon to be detached;

means for admitting into an isolated cell a second flow of inert gas in said counter-current direction with a flow such that the dust layer is detached from said at least one element.

9. Filtration apparatus according to claim 8 further comprising dust discharging means provided in the lower portion of said inlet enclosure.

10. Filtration apparatus according to claim 8 wherein said second inert gas flow admitting means comprises conduit means for introducing said inert gas into the outlet enclosure of each filtration cell, and valve means for independently controlling the flow of said inert gas to each filtration cell.

11. Filtration apparatus according to claim 8 wherein said second inert gas flow admitting means comprises a compressor means for forming a supply of compressed inert gas.

12. Filtration apparatus according to claim 8 further comprising means for generating said inert gas.

13. Filtration apparatus according to claim 12 wherein said inert gas generator comprises an internal combustion engine, and wherein said apparatus further comprises means for generating a dust-laden gas, and means for driving said dust-laden gas generating means by said internal combustion engine.

14. Filtration apparatus according to claim 8 wherein each filtration cell comprises a plurality of said filtering elements and wherein said inlet enclosure comprises wall means partially separating the filtering elements of each filtration cell from one another.

* * * * *